C. PEARSON.
MOWING MACHINE.
APPLICATION FILED APR. 15, 1915.
1,257,387.
Patented Feb. 26, 1918.
2 SHEETS—SHEET 1.
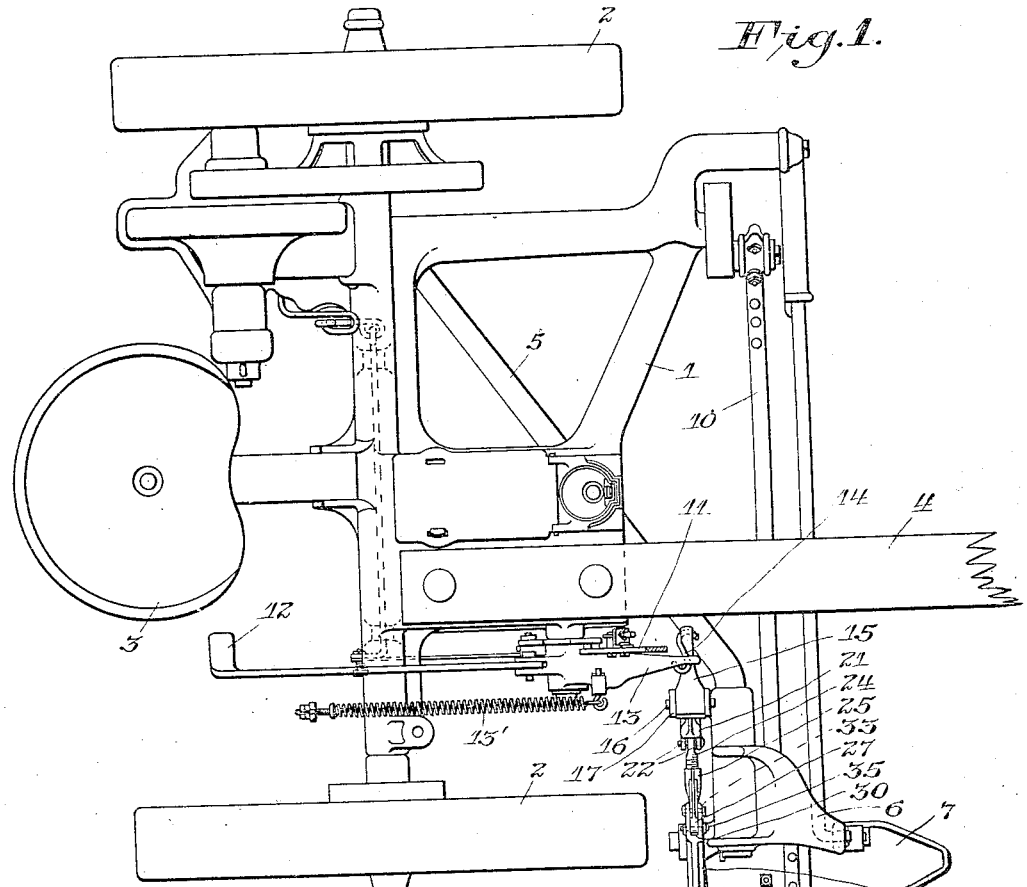
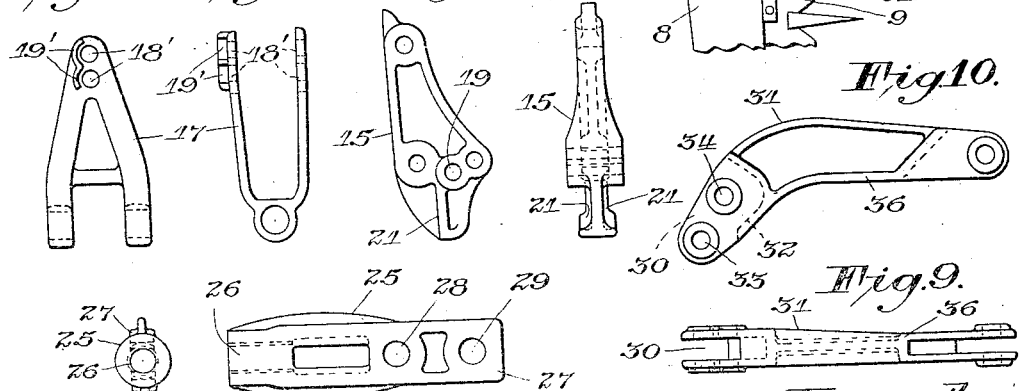
Inventor:
Charles Pearson
By
Atty.

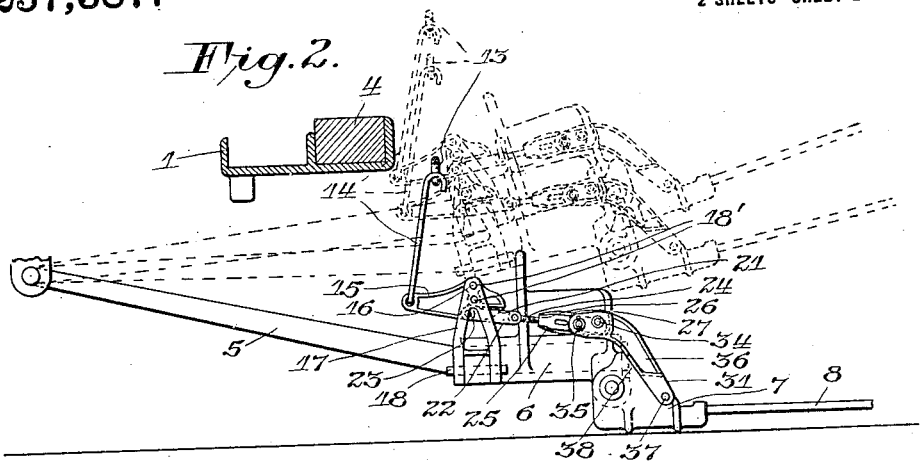
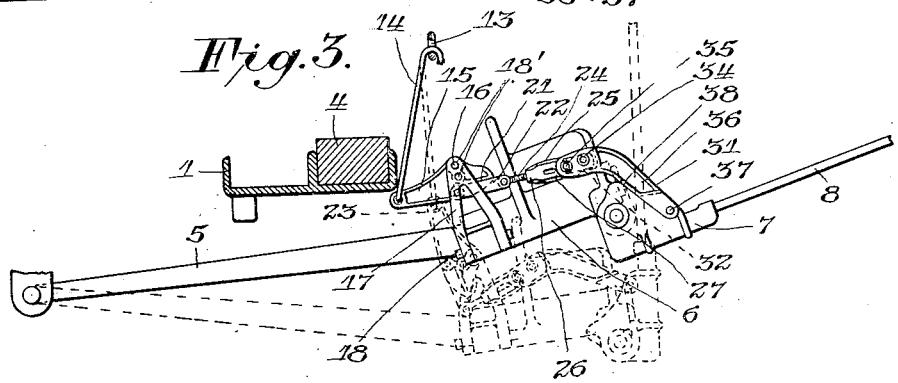
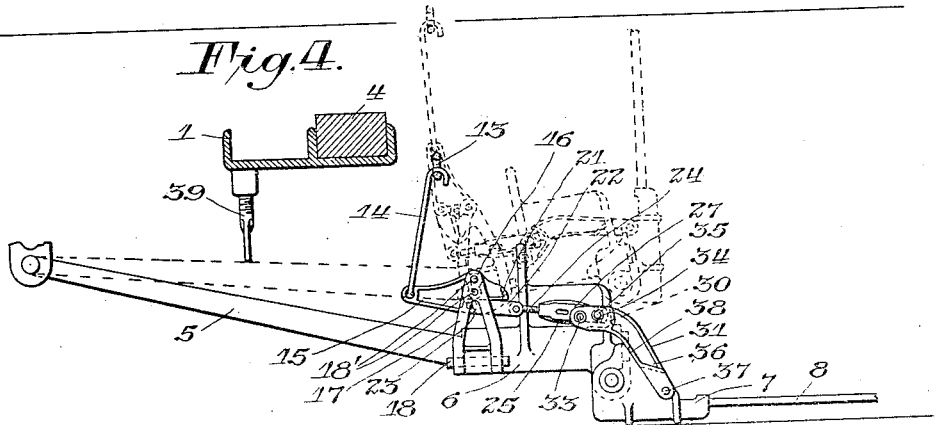

UNITED STATES PATENT OFFICE.

CHARLES PEARSON, OF CHICAGO, ILLINOIS, ASSIGNOR TO INTERNATIONAL HARVESTER COMPANY OF NEW JERSEY, A CORPORATION OF NEW JERSEY.

MOWING-MACHINE.

1,257,387.   Specification of Letters Patent.   Patented Feb. 26, 1918.

Application filed April 15, 1915. Serial No. 21,538.

*To all whom it may concern:*

Be it known that I, CHARLES PEARSON, a citizen of the United States, residing at Chicago, in the county of Cook and State of Illinois, have invented certain new and useful Improvements in Mowing-Machines, of which the following is a full, clear, and exact specification.

My invention relates to mowing machines. It has among its objects to raise the finger bar thereof to and lower the same from an absolute vertical position in an improved manner. A further object of my invention is to raise the finger bar to and lower the same from a plain lift position in an improved manner. A still further object of my invention is to provide an improved mower wherein the same may be used as either a plain or absolute vertical lift mower, as circumstances require, by a simple adjustment of the operating parts. I attain these objects by an improved construction and combination of lifting mechanism for the finger bar hereinafter more fully set forth.

In the accompanying drawings I have, for purposes of illustration, shown one embodiment which my invention may assume in practice.

In these drawings:

Figure 1 is a plan view of a mower equipped with my improvement.

Fig. 2 is a partial, sectional rear elevation of the same showing the adjusting mechanism and finger bar in its normal position and in both of its plain lift positions.

Fig. 3 is a similar view showing the finger bar in full lines in its upper plain lift position, and in dotted lines in the position occupied by it when manually folded into vertical position.

Fig. 4 is a view similar to Fig. 2 showing the finger bar upon the ground and in absolute vertical position, the parts being adjusted for such movement.

Figs. 5 and 6 are detail views of the fulcrum member.

Figs. 7 and 8 are detail views of the gag lever.

Figs. 9 and 10 are detail views of the link pivotally connected to the shoe.

Figs. 11 and 12 are detail views of the adjustable link coöperating therewith.

In the embodiment of my invention illustrated, I have shown a mower which, for the purposes of this application, may be considered as of conventional form, the same including a frame 1 mounted upon carrying wheels 2 and having a seat 3 and a tongue 4. A rising and falling coupling frame 5 is mounted upon this frame and is operatively connected to a yoke 6, the yoke in turn carrying a shoe 7 which is as usual rigidly connected to a finger bar 8 in which a knife 9 is reciprocably mounted and driven by a suitable pitman 10.

As in the usual construction, a lifting lever 11 and a coöperating foot lever 12 are provided, the same being operable from the operator's seat 3 and being held in their several positions by suitable holding or detent mechanism, as, for instance, that described in my copending application, Serial No. 791,744, filed September 25, 1913, though, obviously, other constructions may be used. As shown, both the hand and foot levers are operatively connected with a lifting arm 13, in turn operatively connected to the usual lifting spring 13' carried on the frame. This arm 13 has its front end pivotally connected through a depending link 14 with the stubbleward end of a transversely disposed gag lever 15. As shown, this lever 15 is pivotally mounted at 16 at a point intermediate its ends and adjacent its grassward end upon the upper end of an upstanding, bifurcated fulcrum member 17, which is in turn pivotally mounted at 18 upon the coupling frame 5 and movable about its pivot in a direction at right angles to the direction in which the gag lever may move. It will also be noted that this gag lever is vertically adjustable with respect to the fulcrum member 17, a plurality of holes 18' being provided in the fulcrum member in such a manner as to permit the device to be used with bars of different weight. Attention is here also directed to the fact that the gagging member itself is also provided with an auxiliary pivot 19 to adapt it to like adjustment, suitable cotter guards 19' being provided to shield both pivots.

It will be noted that this gag lever 15 is provided with a cutaway portion on the under side of its grassward end having overlying laterally projecting gagging shoulders 21 which are in turn adapted to coöperate with spaced links 22 pivoted at 23 to the gagging member at a point substantially beneath the pivot 16 thereof in such a manner that when the gag lever is thrown about its pivot to depress its grassward end, the links 22 are lowered bodily with the same and form a part thereof. Pivotally connected to these links 22 is a threaded member, or eye bolt, 24 which is threaded into a coöperating member 25 having a longitudinally disposed threaded bore 26 therein adapted to receive the threaded end of the member 24 and permit adjustment of the length of the link for use with bars of different length. It will also be noted that this member 25 is provided with a squared or rectangularly shaped grassward end 27 having a plurality of spaced pivot holes 28, 29 therein. This end 27 is receivable by a corresponding socket or slotted portion 30 formed in the stubbleward end of a link 31, the said slotted portion being provided with a short ledge 32 extending over about one-half of its length and adapted to underlie the grassward end 27 when the latter is adjusted as hereinafter set forth. As shown, this link 31 is provided with a plurality of spaced holes 33, 34, adjacent its stubbleward end, adapted to receive a pivot pin 35 and coöperate with the holes 28, 29. Further, it will be noted that this link 31 differs in shape from the preceding links, being provided with a downwardly extending portion 36 at its grassward end which is pivoted at 37 to the mower shoe 7. It will also be noted that this pivot is located at the grassward side of the shoe pivot and that the link 31 is adapted to engage an upstanding projection 38 carried on the shoe to produce a jackknifing of the bar, this engagement preferably taking place at a point substantially midway between the ends of the link 31.

When it is desired to use my improved mechanism as a vertical lift device, the parts are adjusted as shown in Fig. 4, the pin 35 then being placed in the hole 29 of the link 25 and in the hole 34 in the link 31, with the rectangular-shaped end 27 of the link 25 seated in the socket 30, as illustrated. Of course, the coupling frame is provided with the usual snubbing member 39 which is preferably of a threaded character and screwed into the frame, the same engaging the coupling frame when it is raised to the dotted line position. With the parts so adjusted, the operating lever 11 is operated, the operator being assisted by the foot lever 12, if he so desires. The initial movement of the lever 11 causes the arm 13 to be rocked upward about its pivot on the frame in such a manner as to lift the parts from the position shown in full lines in Fig. 4 to the position shown in dotted lines therein, the gag lever 15 being pulled upward about its pivot on the fulcrum member 17 by the pull of the link 14 upon the long end of the gag lever and therefore necessarily depressing the links 22 by reason of the action of the gagging ledges or shoulders 21 in such a manner as to raise the bar, the outer end of the same being first lifted. Obviously, as this movement progresses, the coupling frame 5 will also be lifted until it strikes against the snubbing block 39, whereupon the finger bar will move independently thereof to the dotted line position shown, the links 22 being depressed, the link 25 being pulled stubbleward, and the link 31 acting on the projection 38 and swinging about its pivot 35 to raise the bar, with the result that the gag lever and bar move through angles of substantially the same degree and in opposite directions. It will be noted further that during the first stages of this movement, and while the operating lever 11 is readily operated by a full arm pull, the maximum leverage required is available, and that in the subsequent operation of the parts, which requires a reduced leverage, the same are given movement at such an increased speed as to give them a decided impetus toward vertical position. Attention is also directed to the fact that when the finger bar is in this vertical position, it is securely held in position by the links 25, 31, its connection being entirely independent of the connection supporting the coupling frame, which is then held up by the holding force acting on a line between the pivot of the arm 13 to the link 14 and the pivot of the gagging lever 15 upon the fulcrum member 17. In lowering the parts it should further be noted that, as the lever 11 is moved in a reverse direction, the coupling frame and finger bar are lowered automatically and in predetermined sequence, the finger bar always being lowered before the coupling frame. In other words, by my improved mechanism the coupling frame is held up until the finger bar in its lowering movement has unfolded into an operative angle with respect to the ground, i. e., an angle at which the knife may run when the same is automatically thrown in by automatic clutch mechanism.

When the device is used as a plain lift mechanism, the snubbing block 39 is of course removed. The pin 35 is also inserted in the holes 28 and 33, as shown in Figs. 2 and 3. In this position, it is to be noted that the rectangular end 27 of the member 25 rests relatively snugly in the socket 30 on the member 31 adjacent the side and bottom walls thereof, and is not free to turn, as shown in Fig. 3, to hold the link 31 in protracted engagement with the projections 38. Instead, it will be noted that this connection is such as to make the two links relatively rigid against flexure in one direction. Upon movement of the lever 11 rearward about its pivot, the parts will be lifted from the position shown in full lines in Fig. 2 to the position shown in dotted lines therein, the same occupying the lower dotted line position or the upper dotted line position, depending upon the amount of movement of the lever 11. As the parts are initially moved, it will be noted that the finger bar 8 is given a desirable, slight jacknifing action by the link 31 engaging with the upstanding projection 38, i. e., enough to lift its extreme outer end from contact with the ground. After that, the link 31 will disengage from the projection 38 and the links 25 and 31 will move as one rigid piece, the lower side of the member 25 being engaged by the ledge 32 of the link 31 in such a manner as to hold that link and the finger bar against an upward rocking movement. As shown in Fig. 2, an extremely high plain lift is also obtained by this construction, the parts being capable of being raised to give a clearance of fourteen or more inches from the ground at a point beneath the shoe. It will also be noted that even in this extremely high lift position the knife is able to run freely, being disposed at a safe angle with respect to the ground. Attention is also directed to the fact that by this improved construction the bar may be manually folded from the upper plain lift position into vertical lift position and definitely held in such position by means of the weight of the coupling frame, the connection being such as to cause the members 25 and 31 to unite into a rigid connection acting on a line between their pivots. These and other objects of my improved construction will, however, be clearly apparent to those skilled in the art.

It is to be noted that in my improved construction the same mechanism may be used as either a plain or vertical lift mechanism by an adjustment of the pin 35 and insertion or removal of the snubbing member 39, the operations both being so simple that even the most unskilled operator may make the change without difficulty, without special tools, and while in the field. It is also to be noted that in my improved construction, when used as a plain lift, while the outer end of the finger bar is given an initial lifting movement, this end is retained at such an angle with respect to the ground that the knife may run at all times whether the parts are moved to their first or upper elevated position shown in dotted lines in Fig. 2. Attention is also directed to the fact that, when in either of the positions shown in that figure, the finger bar is held against any upward swinging movement tending to bring its knife into a bad angle, such as those normally encountered when the machine moves over rough ground, and the weight of the coupling frame becomes an element to turn the finger bar about its pivotal axis as the lower side of the link 25 is in engagement with the ledge 32 in a manner to make the links 25 and 31 rigid against flexure in one direction. Obviously, however, when the operator desires to fold the bar manually into a vertical position, he may do so by lifting the outer end of the same (Fig. 3), the coupling frame then being lowered slightly. As shown in dotted lines in that figure, ample clearance, of course, exists beneath the shoe even after the coupling frame has thus been lowered.

While I have in this application described one embodiment which my invention may assume in practice, it is, of course, to be understood that the same is used for purposes of illustration and may be embodied in other forms without departing from its spirit.

What I caim as my invention and desire to secure by Letters Patent is:

1. In a mowing machine, a machine frame, a coupling frame pivoted thereto, a finger bar pivoted to said coupling frame, means for raising said coupling frame and finger bar, means including a plurality of links connecting said raising means, coupling frame and finger bar, and means for locking the connected ends of certain of said links whereby after the coupling frame and finger bar have been raised a predetermined amount any downward force exerted on the coupling frame is ineffective in further flexing the finger bar.

2. In a mowing machine, a machine frame, a coupling frame pivoted thereto, a finger bar pivoted to said coupling frame, means for raising said coupling frame and finger bar, means including a plurality of links connecting said raising means, coupling frame and finger bar, and means for locking the connected ends of certain of said links whereby after the coupling frame and finger bar have been raised a predetermined amount any downward force exerted on the coupling frame is ineffective in further flexing the finger bar, said connecting means permitting a further flexing movement of the finger bar if a raising force is applied directly thereto, whereupon the coupling frame is lowered to retain the finger bar in such flexed position.

3. In a mowing machine, a machine frame, a coupling frame having one end thereof pivotally connected with said machine frame, a lifting lever carried by said machine frame, a finger bar pivotally connected with said coupling frame, a gag lever pivotally connected with said coupling frame, a connection between one end of said gag lever and said lifting lever, a link having one end thereof connected with said finger bar, a projection on said finger bar operative as a fulcrum for said link, a second link having one end thereof pivotally connected with the opposite end of said first link, means operatively connecting said gag lever and the opposite end of said second link, and means for locking the connected ends of said links against flexure.

4. In a mowing machine, a machine frame, a coupling frame having one end thereof pivotally connected with said machine frame, a lifting lever pivoted on said machine frame, a finger bar pivotally connected with the opposite end of said coupling frame, a gag lever pivotally connected with said coupling frame, a link connection between one end of said gag lever and said lifting lever, a second link having one end pivotally connected with said gag lever intermediate its ends and below its pivotal axis and adapted to be engaged by the opposite end thereof in a gagging manner, a third link having one end thereof pivotally connected with the opposite end of said second link, a fourth link having one end thereof pivotally connected with said finger bar, an upwardly extending projection carried by said finger bar and adapted to be engaged by the body of said fourth link, and means whereby the opposite ends of said third and fourth links may be flexibly or inflexibly connected.

5. In a mowing machine, a machine frame, a coupling frame having one end thereof pivotally connected with said machine frame, a lifting lever pivoted on said machine frame, a finger bar pivotally connected with the opposite end of said coupling frame in a manner permitting it to turn from a horizontal to a vertical plane, means for adjusting said finger bar and said coupling frame to varying planes, said means including an upstanding projection on said finger bar, a link having one end thereof pivotally connected with said finger bar grassward of its pivoted axis and its body portion adapted to engage with said projection, a gag lever pivotally connected intermediate its ends with said coupling frame, a link connection between one end of said gag lever and said lifting lever, a third link having one end thereof pivotally connected with said gag lever intermediate its ends and below its pivotal axis, gagging elements carried by the opposite end of said gag lever and adapted to engage with said third link, and a fourth link having one end pivotally connected with the opposite end of said third link and its opposite end pivotally connected with the opposite end of said first link in a manner to lock said first and fourth links against flexure in one direction whereby a coöperative action of said first link and said upstanding projection is suspended when said coupling frame and finger bar have been raised to a predetermined plane.

In testimony whereof I affix my signature, in the presence of two witnesses.

CHARLES PEARSON.

Witnesses:
RAY PATTISON,
RAY D. LEE.

Copies of this patent may be obtained for five cents each, by addressing the "Commissioner of Patents, Washington, D. C."